US010761867B2

(12) United States Patent
Zhong et al.

(10) Patent No.: US 10,761,867 B2
(45) Date of Patent: Sep. 1, 2020

(54) NESTED EMULATION AND DYNAMIC LINKING ENVIRONMENT

(71) Applicant: Intel Corporation, Santa Clara, CA (US)

(72) Inventors: Xueliang Zhong, Shanghai (CN); Jianhui Li, Shanghai (CN); Jian Ping Chen, Shanghai (CN); Tingtao Li, Shanghai (CN); Yong Wu, Shanghai (CN); Wen Tan, Shanghai (CN); Xiao Dong Lin, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 429 days.

(21) Appl. No.: 15/843,822

(22) Filed: Dec. 15, 2017

(65) Prior Publication Data
US 2018/0173545 A1   Jun. 21, 2018

Related U.S. Application Data

(63) Continuation of application No. 13/994,725, filed as application No. PCT/CN2012/072770 on Mar. 22, 2012, now Pat. No. 9,851,987.

(51) Int. Cl.
*G06G 7/48* (2006.01)
*G06F 9/455* (2018.01)
*G06F 9/445* (2018.01)

(52) U.S. Cl.
CPC .......... *G06F 9/455* (2013.01); *G06F 9/4552* (2013.01); *G06F 9/44521* (2013.01)

(58) Field of Classification Search
None
See application file for complete search history.

(56) References Cited

U.S. PATENT DOCUMENTS 5,774,694 A   6/1998  Murari
3,086,623 A   7/2000  Broome et al.
(Continued)

FOREIGN PATENT DOCUMENTS

CN   101295265   10/2005
CN   101189578    5/2008
(Continued)

OTHER PUBLICATIONS

The International Searching Authority, Written Opinion of the International Searching Authority and the International Search Report, as dated Dec. 27, 2012 in International Application No. PCT/CN2012/072770.
(Continued)

*Primary Examiner* — Rehana Perveen
*Assistant Examiner* — Nithya J. Moll
(74) *Attorney, Agent, or Firm* — Trop, Pruner & Hu, P.C.

(57) ABSTRACT

Various embodiments include nested emulation for a source application and source emulator. Duplicate source ISA libraries redirect the source emulator library calls to a target library, thereby forcing the native emulator through proper emulation channels between first and second ISAs. Other embodiments concern accelerating dynamic linking by determining certain function calls that, rather than being processed through emulation of PLT code, are instead directly called without the need for PLT code translation. Some embodiments address both nested emulation and accelerated dynamic linking but other embodiments include one of nested emulation and accelerated dynamic linking. Other embodiments are described herein.

20 Claims, 6 Drawing Sheets

(56) References Cited

U.S. PATENT DOCUMENTS

| | | | |
|---|---|---|---|
| 6,631,514 | B1 | 10/2003 | Le |
| 10,120,663 | B2 * | 11/2018 | Hasabnis ............... G06F 8/433 |
| 2005/0015781 | A1 | 1/2005 | Brown et al. |
| 2005/0086451 | A1 | 4/2005 | Yates, Jr. et al. |
| 2006/0184919 | A1 * | 8/2006 | Chen .................. G06F 9/45516 717/127 |
| 2006/0184920 | A1 | 8/2006 | Wang et al. |
| 2007/0006184 | A1 | 1/2007 | Andrews et al. |
| 2007/0130292 | A1 | 6/2007 | Tzruya et al. |
| 2008/0077909 | A1 | 3/2008 | Collins et al. |
| 2008/0092151 | A1 | 4/2008 | Brown et al. |
| 2008/0270740 | A1 | 10/2008 | Wang et al. |
| 2011/0153307 | A1 | 6/2011 | Winkel et al. |
| 2014/0040921 | A1 | 2/2014 | Li et al. |

FOREIGN PATENT DOCUMENTS

| | | |
|---|---|---|
| CN | 101523348 | 9/2009 |
| CN | 104025046 | 1/2012 |
| GB | 2442495 | 4/2008 |
| JP | 2007529063 | 10/2007 |
| JP | 2009517752 A | 4/2009 |
| JP | 2010506252 | 2/2010 |
| JP | 2011134315 A | 7/2011 |
| JP | 2013002952 A | 1/2013 |
| KR | 20050007906 A | 1/2005 |
| KR | 10-2006-0041228 | 5/2006 |
| KR | 10-2009-0095556 | 9/2009 |
| WO | 2006131695 | 12/2006 |
| WO | 2013104107 A1 | 7/2013 |

OTHER PUBLICATIONS

State Intellectual Property Office, Decision of Rejection as dated Jun. 26, 2017 in Chinese Patent Application No. 201280071653.8.
State Intellectual Property Office, Office Action as dated Feb. 5, 2018 in Chinese Patent Application No. 201280071653.8.
Korean Intellectual Property Office, Notice of Preliminary Rejection dated Mar. 21, 2016 in Korean Patent Application No. 10-2014-7026067.
State Intellectual Property Office, People's Republic of China, First Office Action dated Apr. 1, 2016 in Chinese atent Application No. 201280071653.8.
State Intellectual Property Office of the People's Republic of China, Second Office Action dated Nov. 28, 2016 in Chinese Patent Application No. 201280071653.8.
European Patent Office, Supplementary Search Report dated Nov. 9, 2015 in European Patent Application No. 12871825.1.
Japan Patent Office, Notice of Rejection dated Nov. 17, 2015 in Japanese Patent Application No. 2015-500737.
IP Australia, "Patent Examination Report No. 1" in application 2012373895 dated May 13, 2015, 3 pages.
Korean Patent Office, Notice of Rejection dated Oct. 16, 2015, in Korean Patent Application No. 10-2014-7026067.
State Intellectual Property Office, Fifth Office Action dated Oct. 12, 2018 in Chinese Patent Application No. 201280071653.8, six pages.
Korean Intellectual Property Office, Notice of Allowance dated Sep. 22, 2016 in Korean Patent Application No. 10-2014-7026067, three pages.
Japanese Patent Office, Notice of Allowance dated Jun. 19, 2016 in Japanese Patent Application No. 2015-500737, three pages.
State Intellectual Property Office, Fourth Office Action dated Jun. 8, 2018 in Chinese patent application No. 201280071653.8, 13 pages.
European Patent Office, Communication pursuant to Article 94(3) EPC dated Jun. 4, 2018 in European patent application 12871825.1, five pages.
National Intellectual Property Administration, P.R. China, Notification to Grant Patent Right for Invention dated Jan. 28, 2019 for Chinese Patent Application No. 201280071653.8, four pages.

* cited by examiner

```
     Input:  Translation Unit Formed in BT Translator Component                                    700
     Output: Optimized Translation Unit 701  //The PLT code pattern:
702  //PLT0    /*constant hex data*/
703  //PLT1    /*constant hex data*/
704  //...

705  For Each Instruction in Translation Unit:
706          If Instruction is CALL Instruction:
707                  Addr = Target Address of CALL Instruction
708                  If addr[0] Matches PLT0, and addr[1] Matches PLT1,...:/* pattern matching*/
709                          Entry = Get GOT Entry Encoded In This PLT Code Block
710                          Library-Function-Address = GOT[entry]
711                          If Library-Function-Address Passed Address Verification in DLA loader:
712                                  Change Target Address of CALL Instruction to Library-Function-Address
713                                  Remove PLT Code Starting From Addr in Translation Unit
```

NESTED EMULATION AND DYNAMIC LINKING ENVIRONMENT

CROSS REFERENCE TO RELATED APPLICATIONS

This application is a continuation of U.S. patent application Ser. No. 13/994,725, filed Jun. 15, 2013, entitled "Nested Emulation and Dynamic Linking Environment", which is a § 371 National Stage Entry of International Application No. PCT/CN2012/072770, filed Mar. 22, 2012, entitled "Nested Emulation and Dynamic Linking Environment". The content of each of the above applications is hereby incorporated by reference.

BACKGROUND

A computing device may be characterized by its Instruction Set Architecture (ISA). Typically, a computing device may include Operating System (OS) services, and the OS services may include the runtime library (LIB) services, developed for the ISA of the computing device, to help application developers develop applications to operate on the computing device. If the application is written for an ISA other than the ISA for the computing device, the application may need to be emulated. Specifically, emulation allows an application (written for a first ISA) to execute on a computing device's architecture (which uses a second ISA). ISA dependent portions of applications may include function calls to source LIB services, which need to be emulated using target LIB services. Further, ISA dependent portions of applications may include callback functions (e.g., functions that call back from an ISA dependent runtime LIB to an emulated application, functions that call back to source LIB services that need to be emulated). Such callbacks may not be discovered until runtime, thereby rendering traditional approaches (e.g., binary translation) ineffective in bridging the two ISAs.

To execute the above applications, the application may need to be linked. Linking produces an executable program from compiled modules (e.g., libraries) by resolving interconnection references (e.g., interconnection between a library routine called by an application). This linking (also called "loading" at times herein) may be done dynamically via a binary translation system (BT). Dynamic linking defers much of the linking process until a program starts running A dynamic linker may be part of an OS that loads and links shared libraries for an executable when the executable is executed. The technique may use a procedure linking table (PLT), global offset table (GOT), and an indirect jump to direct an application's library call to a target function in a dynamic linked library.

BRIEF DESCRIPTION OF THE DRAWINGS

Embodiments of the present invention will be described by way of exemplary embodiments, but not limitations, illustrated in the accompanying drawings in which like references denote similar elements, and in which:

FIGS. 6 and 7 respectively illustrate methods and pseudo code for accelerating dynamic linking in embodiments of the invention.

DETAILED DESCRIPTION

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted. The phrase "embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Various embodiments include nested emulation for a source application and source emulator. Duplicate source ISA libraries redirect the source emulator library calls to a target library, thereby forcing the native emulator through proper emulation channels between first and second ISAs. Other embodiments concern accelerating dynamic linking by determining certain function calls that, rather than being processed through emulation of PLT code, are instead directly called without the need for PLT code translation. Some embodiments address both nested emulation and accelerated dynamic linking but other embodiments include one of nested emulation and accelerated dynamic linking.

Figure 1:
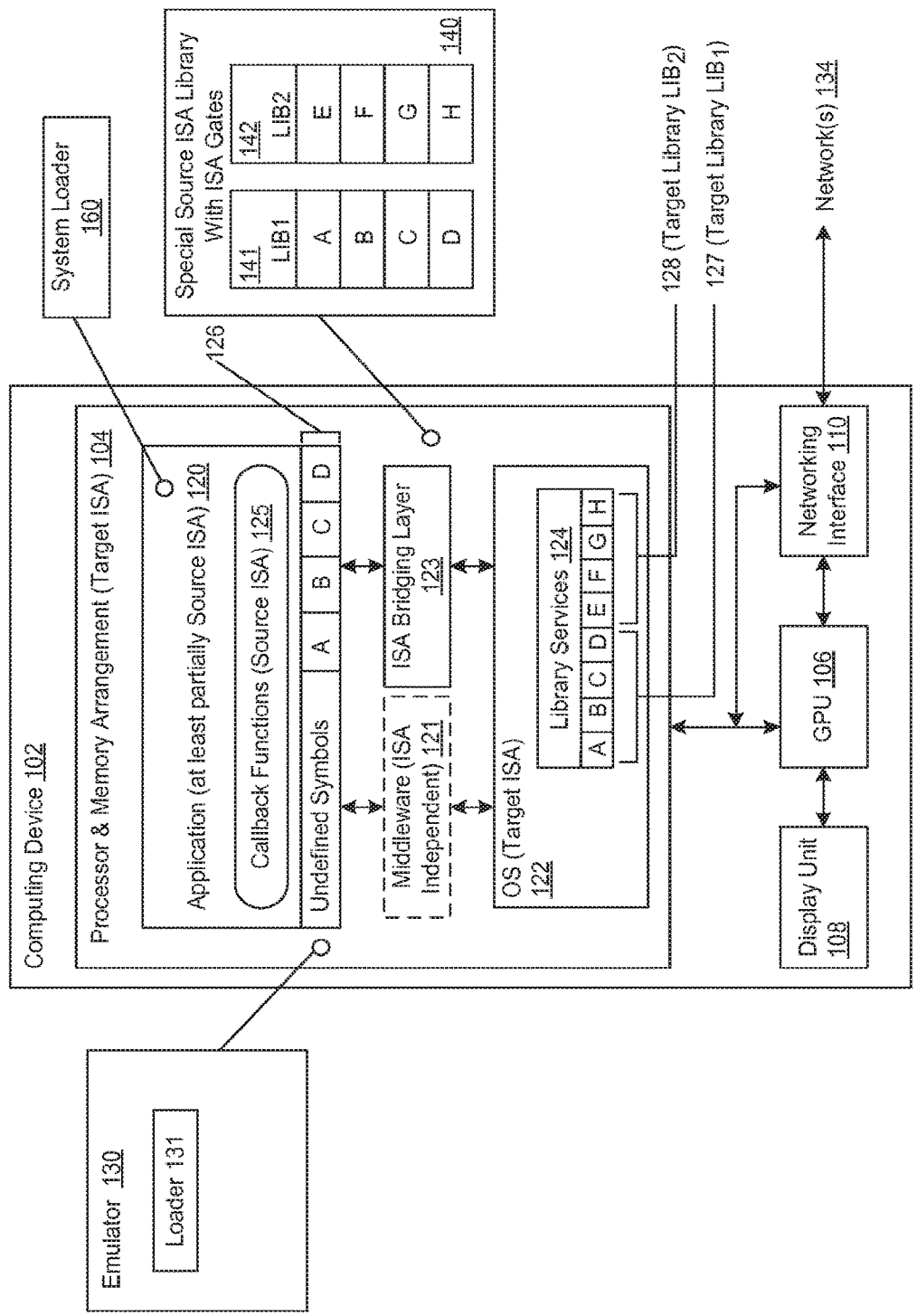
FIG. 1 illustrates a computing device including ISA bridging in an embodiment of the invention.

FIG. 1 illustrates an example computing device including ISA bridging (optionally with callback) in an embodiment. Computing device 102 may include processor and memory arrangement 104, which includes or couples to OS 122, ISA bridging layer 123, application 120, graphics processing unit (GPU) 106, display unit 108, and networking interface 110, coupled (i.e., directly or indirectly) with each other as shown. OS 122 may include a library of services 124 (subdivided into libraries 127, 128 that collectively include symbols "A" through "H"). Computing device 102 may also include optional middleware 121 between application 120 and OS 122. As will be described in more detail below, ISA bridging layer 123 may be configured with various runtime features and services (including, but not limited to, dynamic binding) to enable application 120 to be implemented in a source ISA in whole or in part (e.g., when an ISA-independent middleware 121 is also used), while OS 122 (including library services 124) may be implemented in a target ISA that is different from the source ISA. Further, application 120 may be an application (in particular, the portion implemented using source ISA) that includes usage characteristics of library services 124 that require various elements (e.g., functions) of library services 124 to "callback" various callback functions 125 of application 120 under various conditions. ISA bridging layer 123 may also be referred to herein as a process virtual machine (PVM).

Computing device 102 may be a server, desktop computer, laptop computer, tablet computer, Smartphone, personal digital assistant, game console, Internet appliance, mobile internet device, cell phone, mobile networking device, mobile computing node, or other computing device. Processor and memory arrangement 104 represents a broad range of processor and memory arrangements including arrangements with single or multi-core processors of various execution speeds and power consumptions, and memory of various architectures (e.g., with one or more levels of caches) and various types (e.g., dynamic random access, FLASH, and so forth). In various embodiments, GPU 106 may be configured to provide video decoding and/or graphics processing functions to OS 122, while display unit 108 may be configured to enable multi-media content (e.g., HD video) to be rendered thereon. Similarly, GPU 106 and display unit 108 are intended to represent a broad range of graphics processors and display elements known in the art. Likewise, network(s) 134 is (are) intended to represent a broad range of networks known in the art. Examples of network(s) 134 may include wired or wireless, local or wide area, private or public networks, including the Internet. OS 122 (including library services 124), except for the application programming interface (API) defining invocation of library service 124, represents a broad range of OS elements known in the art. OS 122 may include conventional components such as a kernel configured to manage memory resources, schedule task execution, and so forth, and device drivers configured to manage various device resources. In embodiments, OS 122 may include a virtual machine in support of optional middleware 121 (e.g., Android™ virtual machine in support of the Android™ application framework). In addition to defining invocations of library services 124, to facilitate invocation of callback functions 125 of application 120 the API of library services 124 may also include the corresponding stubs and signatures of callback functions 125 of application 120. Examples of OS 122 may include Windows® operating systems, Linux®, Android™, i050, and the like. Similarly, optional middleware 121 is intended to represent a broad range of middleware elements including, but not limited to, ISA-independent middleware. Examples of middleware 121 may include, but are not limited to, Android™ Application Framework, Java™, or other application frameworks or ISA-independent execution environments. Likewise, application 120 (including callback functions 125) represents a broad range of applications including applications for personal assistant, productivity, social networking applications, calendaring, word processing, spreadsheets, Twitter®, Facebook®, browsers, and the like.

The remaining elements of FIG. 1 are discussed further below following a discussion of FIG. 2.

Figure 2:
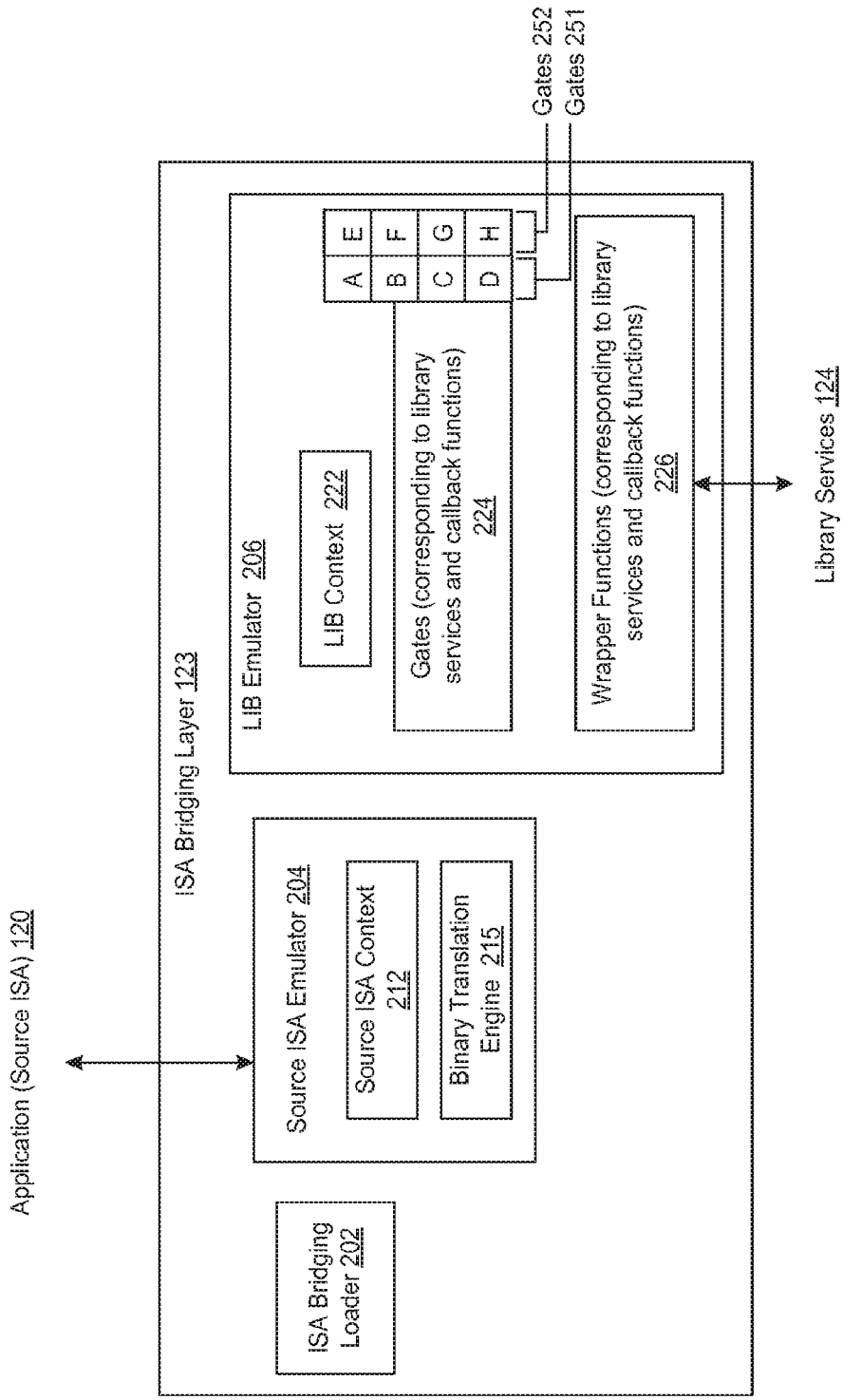
FIG. 2 illustrates the ISA bridging layer of FIG. 1 in further detail.

In FIG. 2 ISA bridging layer 123 may include ISA bridging loader 202, source ISA emulator 204, and target ISA Library emulator 206 (configured to provide various runtime features and services including dynamic binding services). Source ISA emulator 204 may include source ISA context 212, and binary translation engine 215. Source ISA emulator 204 may maintain in source ISA context 212 the execution context of source ISA architecture including, for example, the current execution instruction pointer (IP). Binary translator engine 215 may be configured to translate source ISA instructions to target ISA instructions. LIB emulator 206 may include target ISA LIB context 222, gates 224 (e.g., data structure used by a processor to control access to privileged functions, change data segments, switch tables, and the like), and wrapper functions 226. LIB emulator 206 may maintain in target ISA LIB context 222 the execution context of target ISA Library 124. In various embodiments, there may be a corresponding gate 224 and wrapper function 226 pair for every library service 124 (e.g., function), with the pair being configured to facilitate the calling of library service 124 by application 120, across the source and target ISA architectures. Similarly, there may be one corresponding pair of gate 224 and wrapper function 226 per callback function 125, configured to facilitate callback of callback function 125 by library services 124, across the target and source ISA architectures.

ISA bridging loader 202 may be a utility configured to load application 120 into memory. In loading application 120, ISA bridging loader 202 may be configured to resolve any unresolved symbols 126 of application 120 associated with a library that corresponds to source application 120. A symbol may be an identifier (e.g., text string) of a register, memory address, and the like. ISA bridging loader 202 may be configured to modify the symbols (to callback functions 125), and associate the symbols for callback functions 125 to the corresponding wrapper functions 226. ISA bridging loader 202 may gain control of loading from the loader (not shown) of OS 122 (or middleware 121, if employed) in any one of a number of known manners including the use of binary format based control transfer or load/pre-load variables when supported by OS 122 or middleware 121. In other embodiments, the loader of OS 122 (or middleware 121, if employed) may be modified to facilitate the transfer of control to ISA bridging loader 202 instead.

Source ISA emulator 204 may emulate source ISA 120 "on top of" target ISA 122 to run source ISA application 120. As described earlier, source ISA emulator 204 may be configured to maintain source ISA execution context 212. For example, source ISA emulator 204 may be configured to track the source ISA IP (instruction pointer) during execution of application 120. When application 120 attempts to invoke a library service 124, source ISA emulator 204 may be monitoring source ISA execution and may invoke and transfer execution control to LIB emulator 206 instead. In various embodiments, source ISA emulator 204 may invoke and transfer execution control to the corresponding gate 224 (discussed further below) of library service 124.

LIB emulator 206 may emulate a source LIB (or any other LIB) through mapping to target LIB 124. Also, LIB emulator 206 may be configured to maintain target ISA library (LIB) execution context 222. Gates 224 corresponding to library services 124 may be configured to respectively redirect calls to library services 124 and to corresponding wrapper functions 226 that process and set up the calls. Gates 224 corresponding to callback functions 125 may be configured to respectively transfer execution control for callbacks from the corresponding wrapper functions 226 to source ISA emulator 204. In various embodiments, each gate 224 may include an instruction configured to effectuate redirection to the corresponding wrapper function 226 or source ISA emulator 204. In various embodiments, the instruction of each gate 224 may be a source ISA instruction configured to cooperate with the binary translation engine 215 to effectuate execution control redirection. In various embodiments, each gate 224 may further include an indicator identifying the corresponding wrapper function 226.

In various embodiments, for processing and setting up a call to the corresponding library service 124, each wrapper function 226 corresponding to a library service 124 may be configured to retrieve the associated parameter values of the call from source ISA context 212, convert the call from the source ISA application binary interface (ABI) format to the target ISA ABI format, and save the converted call with the parameter values in LIB context 222. On a callback to a callback function 125, execution control may be transferred to the corresponding wrapper function 226 of callback function 125. In various embodiments, for processing and setting up a callback to a callback function 125 of application 120, each wrapper function 226 corresponding to a callback function 125 may be configured to convert the callback from the target ISA ABI format to the source ISA ABI format, attach the associated parameter values of the callback, and save the converted callback with the parameter values in source ISA context 212. Gates 224 corresponding to a callback function 125 may be configured to invoke the source ISA emulator 204 with the source ISA context 212 (prepared by wrapper function 226 and corresponding to the callback function 125) to emulate the callback function presented in Source ISA format on target ISA 104.

Referring to both FIGS. 1 and 2, in some application environments ISA bridging layer 123 may intercept actions of system loader 160. A system loader may be provided as part of LIB Services on source ISA 120 as the counterpart of LIB Services 124 on target ISA 122. System loader 160 is not dedicated to just application 120 but instead operates with various components (e.g., multiple applications) at the application 120 layer. ISA bridging layer 123 may intercept function calls from application 120 to system loader 160 and redirect such calls to ISA bridging loader 202, which links source application 120 to ISA gates 224 instead of other originally targeted libraries. At run time, when application 120 calls a library (located in source ISA 120 or elsewhere) ISA gates 224 redirect the control to semantically identical libraries 124 on target ISA 122. However, in some instances application 120 (e.g., LIBmono) may be configured to rely on its own loader 131 (e.g., to load a library) and resolve undefined symbols 126. Such a loader may be dedicated to emulator 130 and/or application 120 and serve in place of or in addition to system loader 160. ISA bridging layer 123 may not be configured to monitor loader 131 (or even know loader 131 exists). As a result, application 120 may attempt to link directly to target library LIB1 127 (which may have libraries or symbols that have the same names as those of a library initially targeted by application 120). ISA bridging layer 123 may be unable to intercept loader 131 (which may use a different call than that of system loader 160) at run time. This may result in loader 131 incorrectly loading and linking with target ISA library LIB1 127, bypassing emulators 204 and 206, resulting in improper application execution.

To address this issue, embodiments of the invention provide nested (i.e., multi-layer) emulation for emulator 130 and for application 120. In one example, application 120 (emulation layer 3) is emulated by emulator 130 (emulation layer 2), which is emulated by ISA Bridging Layer 123 (emulation layer 1), which is "on top of" target ISA 122 (emulation layer 0).

One embodiment includes special source ISA library 140, including libraries LIB1 141, LIB2 142 to be loaded by emulator 130. As shown in FIG. 1, source ISA 120 includes undefined symbols 126 "A", "B", "C", and "D". Libraries LIB1 141, LIB2 142 may use the same library names (including the same function name or names) as corresponding target libraries 127, 128. For example, source library 141 and target library 127 are both named "LIB1" and both include functions named "A", "B", "C", and "D". When emulator 130 tries to resolve undefined symbols 126 "A", "B", "C", and "D" it finds corresponding symbols in special library 141. Then emulator 130 links its undefined symbol, such as symbol "A", with the corresponding symbol "A" exposed by the special library LIB1 141. For each of functions "A", "B", "C", and "D", special library LIB1 141 (as well as LIB2 142 for functions "E", "F", "G", and "H") implements a gate (see gates 251, 252) for the function instead of the actual function. For example, function "A" of library 141 merely includes an ISA gate for function "A" (see gate "A" of gates 251, which includes a gate but does not in fact include Function "A"), which redirects the control to the semantically identical library LIB1 127 on target ISA 122. In one embodiment, special source ISA library 140 only contains ISA gates.

As indicated in FIG. 1, in one embodiment ISA gates are organized in separate libraries 141, 142, which may be loaded on demand. For example, emulator 130 may only load (i.e., link) LIB1 141 while waiting to load LIB2 142 (and other libraries) if and when the functions corresponding to LIB2 142 are needed by application 120.

Figure 3:
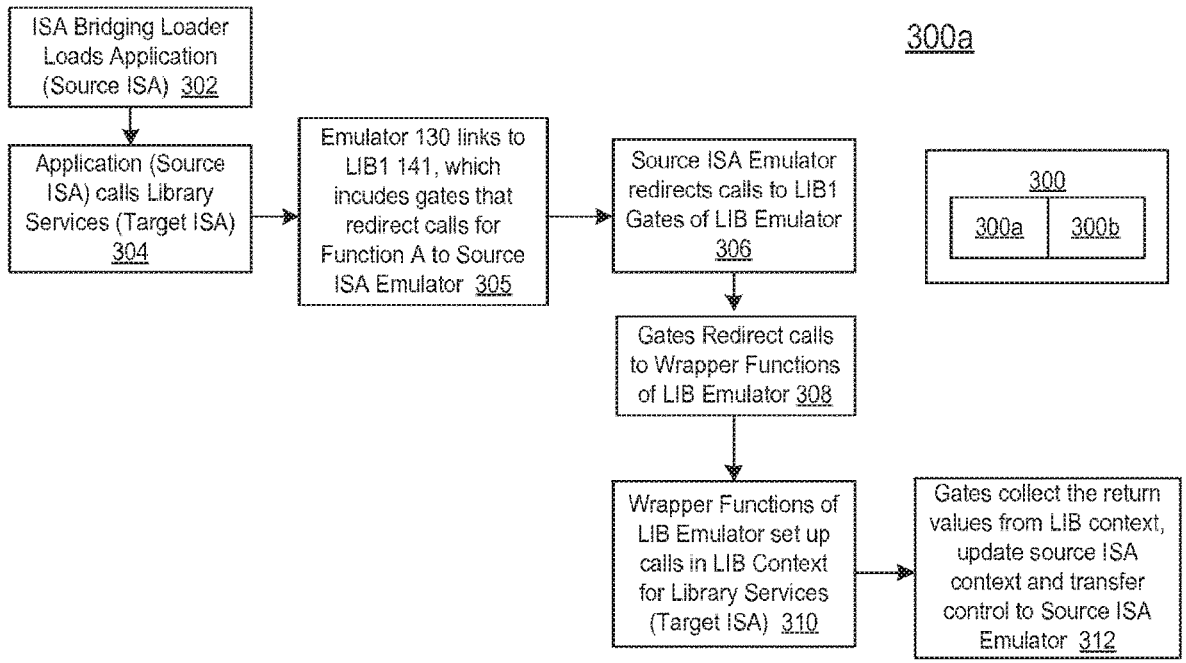
FIGS. 3 and 4 illustrate methods for bridging calls and callbacks between an application of a source ISA and library services of a target ISA in embodiments of the invention.
Figure 4:
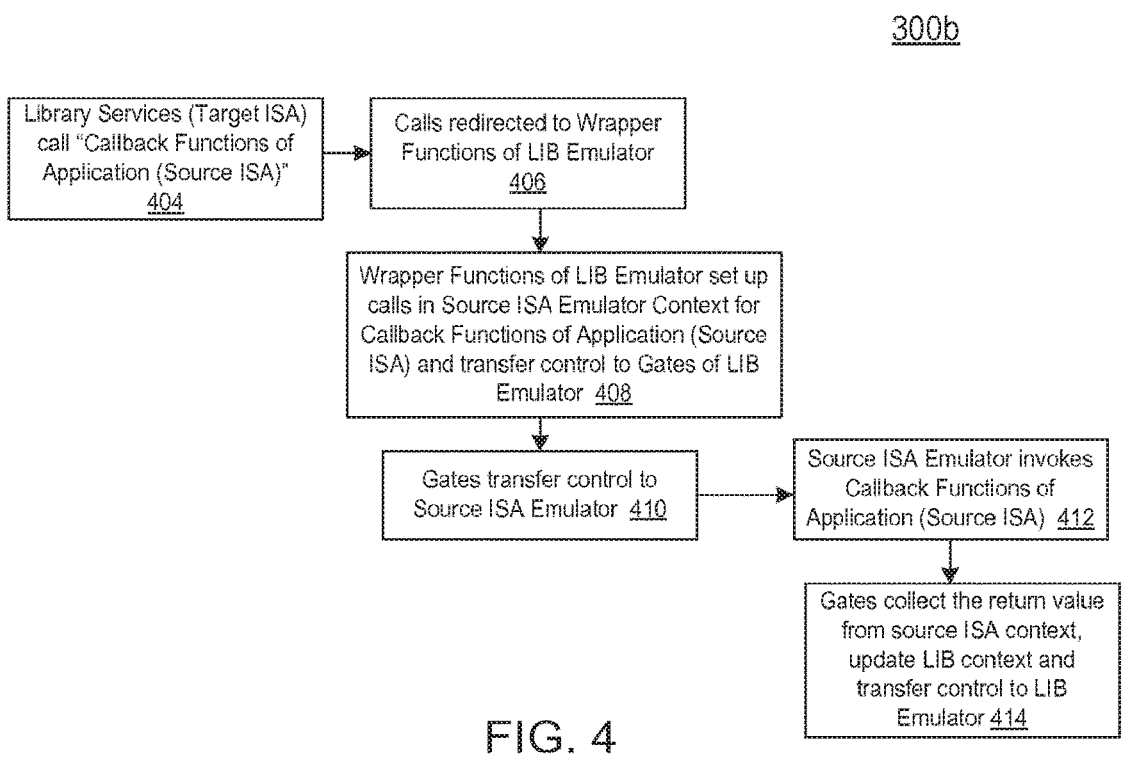

FIGS. 3-4 illustrate example ISA bridging methods with callback in accordance with embodiments of the invention. Method 300 may include two parts, part 300a for bridging calls from application 120 (of source ISA) to library services 124 (of target ISA), and part 300b for bridging callbacks from a library service 124 (of target ISA) to a callback function 125 of application 120 (of source ISA). Parts 300a and 300b may be implemented independently of one another. Also, various embodiments need not concern wrapper functions and/or callback functions but may instead focus on other facets of nested emulation such as, for example, special source ISA libraries 141, 142.

In FIG. 3 at block 302, ISA bridging loader 202 may load source application 120. In loading application 120, ISA bridging loader 202 may resolve symbolic names or references 126 to library services 124, and modify symbolic names or references of callback functions 125, as earlier described. In block 304, in the course of execution application 120 may call one of library services 124. In various embodiments, application 120 may require a callback to one of its callback functions 125 by the called library service 124. In embodiments, application 120 may include as part of the call to the called library service 124 a pointer to a callback function 125. Instead of passing the pointer to the callback function 125, the wrapper function 226 of the library service 124 may pass the corresponding wrapper function 226 of the call back function 125. At block 305 emulator 130 attempts to link to a library and in so doing links to LIB1 141 (which is equivalently named to LIB1 127). LIB1 141 includes gates that redirect function calls (e.g., Function "A") to source ISA emulator 204. At block 306 source ISA emulator 204, on detection of the call (e.g., through monitoring of the source ISA IP and determining that the IP is referencing an address within the address scope of the target library), may redirect the call and transfer execution control to the corresponding gate 224 of the library service 124 in LIB emulator 206. For example, for function "A" gate "A" of LIB1 141 may redirect the call to Source ISA Emulator 204 and then to gate "A" of gates 251. At block 308, the appropriate gate from gates 224 may further redirect the call and transfer execution control to the corresponding wrapper function 226 of the called library service 124. At block 310, wrapper function 226 of the called library service 124 may process the call, and set up the call in LIB context 222 for execution by the called library service 124, as earlier described. At block 312, gate 224 of the called library service 124 may collect the return value(s)

of the call from LIB context 222, update source ISA context 212, and transfer execution control to source ISA emulator 202.

Thus, FIG. 3 illustrates a form of nested emulation wherein an application (e.g., a game) is run on top of an emulator (e.g., emulator 130), wherein the application is formatted for a first ISA. The emulator may run on top of (i.e., be nested by) ISA Bridging Layer 123, which performs transparent binary translation of the application and runs the emulator on a second ISA that is different from the first ISA. This is accomplished using ISA Bridging Layer 123 and one or more special source ISA libraries (e.g., 141, 142), which are linked with emulator 130 using its own loader 131. When emulator 130 invokes libraries, emulator 130 invokes ISA gates (e.g., 141, 142) that then map the function call to target ISA libraries 127, 128 via gates 251, 252 (which are separate libraries of the general collection of gates 224). Embodiments may be extended to cover an arbitrary number of emulation layers (e.g., 2, 3, 4, 5, and so on). Each emulation layer is linked with special ISA libraries (which include or couple to ISA gates) that are redirected to the next level of emulation layer.

In FIG. 4 (part 300b) at block 404, in the course of or upon completion of a called library service 124, library service 124 may callback a callback function 125 of application 120 (e.g., by calling the callback pointer passed by application 120). At block 406, execution control may be transferred to the corresponding wrapper function 226 of callback function 125, in accordance with the modified reference. At block 408, wrapper function 226 may process the callback, set up the callback in source ISA context 212 for execution by the callback function 125 of application 120, as described earlier, and thereafter, transfer execution control to the corresponding gate 224 of the callback function 125. At block 410, gate 224 corresponding to the callback function 125 may redirect the callback and transfer execution control to the ISA emulator with the source ISA context prepared by the wrapper function 226. At block 412, source ISA emulator 204 may start the emulation of the call back function according to the IP within the source ISA context. At block 414, gate 224 of the callback function 125 may collect the return value(s) of the callback from source ISA context 212, update LIB context 222, and transfer execution control to LIB emulator 206 to return the return values of the callback function 125 to the library service 124.

For ease of understanding various embodiments have been described with one ISA bridging layer 123 bridging one source ISA to one target ISA. However, the present disclosure is not so limited. In embodiments, multiple ISA bridging layers 123 may bridge multiple source ISAs to the target ISA or ISAs. In some of these embodiments, a dispatcher may additionally be provided to detect the bridging required, and instantiate the appropriate ISA bridging layer or layers 123 to provide the required ISA bridging. Further, in various embodiments, the present disclosure may be practiced with substituted binaries (in target ISA) for portions of application 120 (in source ISA) to reduce the amount of bridging needed. In other embodiments, some of the resources used for bridging (e.g., some of the wrapper functions) may be located on a remote server accessible to ISA bridging layer 123. Still further, for ease of understanding ISA bridging layer 123 has been described as being configured to bridge a source ISA and to a different target ISA. However, for various applications ISA bridging layer 123 may be employed to bridge a source ISA and a target ISA that are the same. In such applications, one or more of the described elements (e.g., binary translation engine 215) may not be needed. An example of such an application may be to provide enhanced operational security to computing device 102. Other applications may likewise benefit from such bridging. Accordingly, the present disclosure may be a solution to the technical problem of a computing device with one ISA supporting applications developed for another ISA where the applications have usage characteristics of requiring, on occasions, callbacks from the called library services. The advantage of the present disclosure may include avoiding the need to fully translate or re-implement the application in the computing device's ISA.

Embodiments of the invention are not limited to nested emulation or any of the other features described above. For example, one embodiment concerns accelerating BT emulation dynamic linking to make such linking comparable (e.g., in terms of speed) to static linking.

Figure 5:
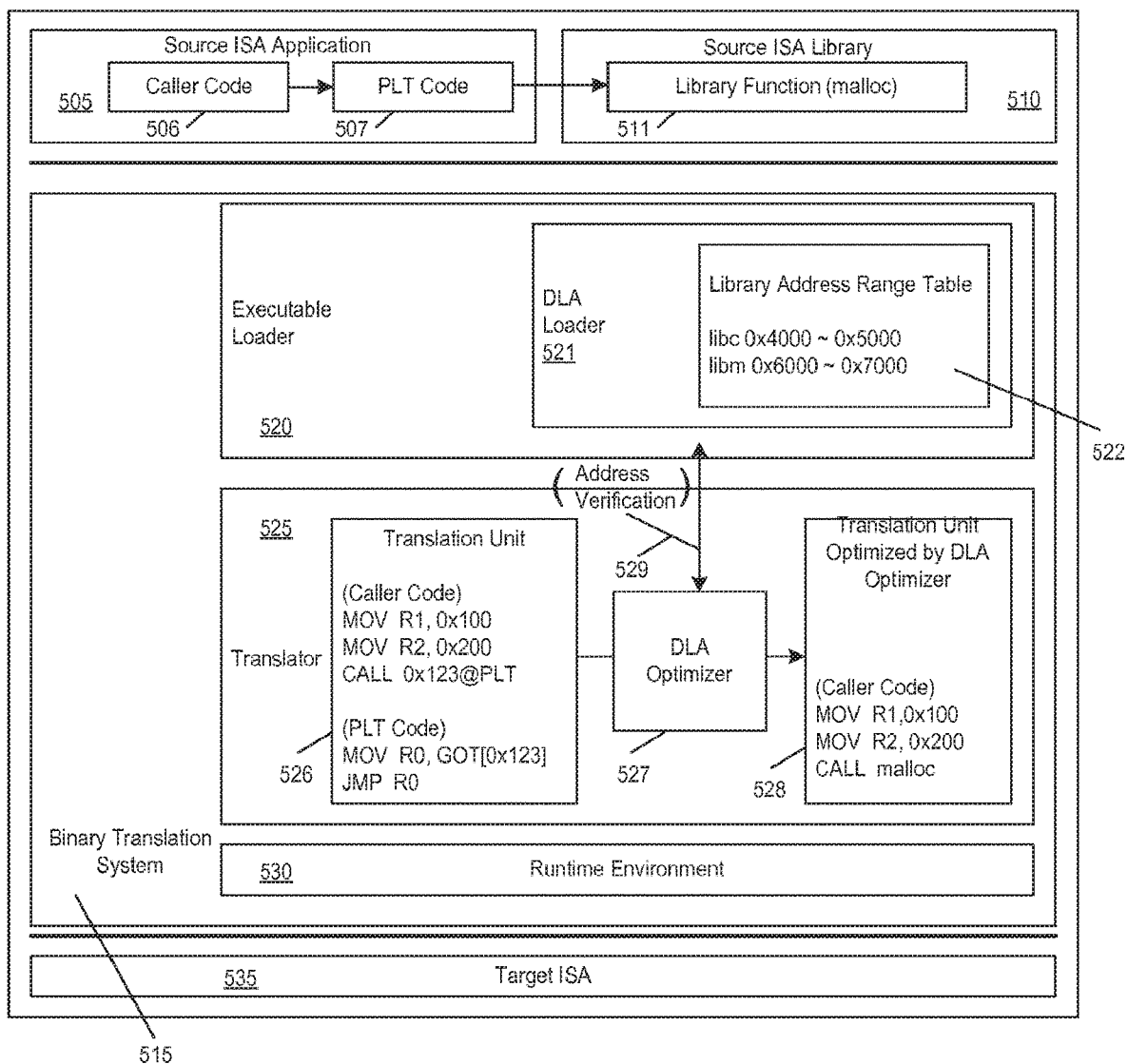
FIG. 5 illustrates a BT system in one embodiment of the invention.

A traditional dynamic linking system may concern a source ISA application (e.g., application 120) that must link to a library. To do so, the application may use caller code (with which to call the library), PLT code (containing code for reading a GOT), and a GOT (which may include unresolved symbols and a listing of function locations). The BT system may use an executable loader, translator, and runtime environment to emulate the application to run on the target ISA. As noted above, use of PLT and GOT based methods may require an indirect jump to direct an application's library call to a target function in a dynamic linked library. However, the indirect jump of dynamic linking brings extra runtime overhead as compared to static linking. FIG. 5 describes an embodiment for accelerating dynamic linking, which may be performed using a dynamic linking accelerator (DLA) in a BT system.

BT system 515, which includes executable loader 520, translator 525, and runtime environment 530, emulates source ISA application 505 on target ISA 535. Executable loader 520 loads source ISA application 505 and source ISA library 510, which is to be dynamically linked to application 505. Translator 525 groups the loaded instructions from application 505 into translation units, such as translation unit 526, and performs source ISA to target ISA binary translation on each translation unit. Runtime environment 530 provides a supporting environment and helper libraries (not shown) to run translated code on target ISA 535.

The embodiment of FIG. 5 enhances BT by, for example, using DLA loader 521 and DLA optimizer 527. DLA loader 521 uses library address range table 522 to store the address ranges of each dynamically linked library. Table 522 is used for address verification and for controlling which library calls should be accelerated. For example, calls to certain system libraries (e.g., LIBc or LIBm) are good candidates for acceleration because they are likely to be loaded and stay loaded during application 505 execution. However, other user libraries, which are likely to be frequently loaded and unloaded, may not be good candidates due to the operational expense of the repeated translations that would accompany the repeated loading and unloading. Thus, those library calls that are selected for acceleration may be stored in table 522 while other library calls are not stored in table 522.

As explained in greater detail below, DLA optimizer 527 analyzes PLT code 507 in source ISA application 505 and calculates the address for the source library 511. This address is then compared to the address ranges stored in table 522 (e.g., LIBc is in the address range 0x4000-0x5000). If the address matches any address range, DLA optimizer 527 then replaces PLT code 507 with a direct call to a library function. With this DLA enhancement, the PLT code is no longer emulated in BT system 515. As a result, dynamic linking may be as fast as static linking (or at least improved upon in regards to traditional dynamic linking). An embodiment for performing dynamic linking is addressed in detail with regard to FIG. 6.

Figure 6:
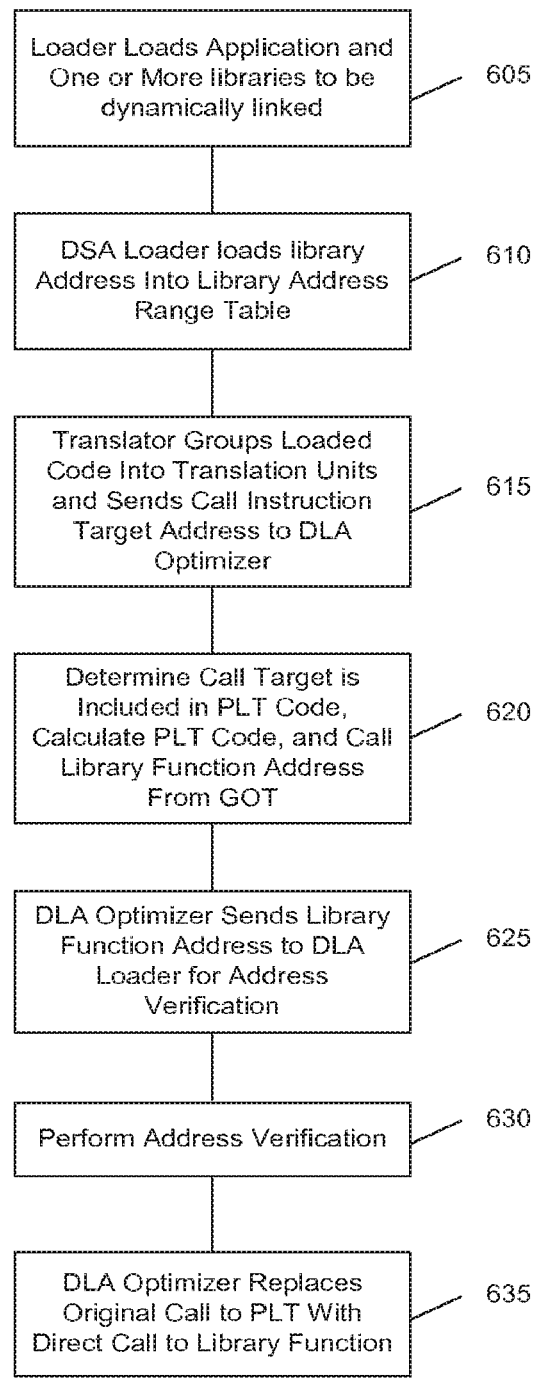

FIG. 6 includes process 600 for accelerated dynamic linking using DLA loader 521 and DLA optimizer 527. In block 605, when source ISA application 505 runs on BT system 515 executable loader 520 loads application 505 and its dynamically linked libraries (e.g., library 510 which may include, for example, LIBc, LIBm, LIBc++, and the like). In block 610 DLA loader 521 records the memory address range of each loaded library and stores the address or addresses in library address range table 522 (e.g., LIBc is in the address range 0x4000-0x5000). In block 615 translator 525 groups the loaded code 505 into one or more translation units (e.g., unit 526) following the emulated execution flow of application. For example, translator 525 may add instructions into one translation unit until a control transfer instruction is met. Upon a control transfer instruction being met, translator 525 may continue to add instructions following the control transfer instruction's target address(es) according to heuristic or history information associated with the control transfer instruction (see, e.g., block 526 of FIG. 5). During grouping, when translator 525 meets a call instruction (e.g., CALL 0X123@PLT) translator 525 sends the call target address (e.g., 0X123) to DLA optimizer 527. In block 620, DLA optimizer 527 uses code pattern matching (addressed further below) to determine if the call target address (e.g., 0X123) is included in PLT code. If the call target is determined to be in PLT code, DLA optimizer 527 calculates the PLT code and calls (e.g., "CALL malloc" which allocates memory as prescribed by the call the function) the library function address from GOT (not shown but included in code 505). In block 625, DLA optimizer 527 sends this library function address to DLA loader 521 for address verification (see arrow 529 of FIG. 5). In block 630, DLA loader 521 compares the library function address supplied from DLA optimizer 527 with the contents in the library address range table 522 to make sure the supplied address is a valid candidate for acceleration. Once verification is performed, in block 635 DLA optimizer 527 replaces the original call to PLT 507 with a direct call to library function 511 and removes PLT code from the translation unit (see unit 528, which does not include PLT code from unit 526). As a result, the PLT code is no longer emulated in BT system 515 (thereby avoiding emulation overhead).

FIG. 7 includes pseudo code for implementing dynamic link accelerations using, for example, DLA loader 521 and DLA optimizer 527 and portions of the process of FIG. 6. For brevity, every line of the code is not discussed. Lines 706-707 concern recognizing a call instruction and its target address. In line 708, if the target address and its surrounding addresses are located in PLT code, then this pattern match indicates the call likely targets PLT code. In lines 709-711 the proper library address is found and verified. In lines 712-713 PLT code is replaced with a direct call to thereby avoid costly emulation of PLT code and its associated indirect jumps and lookups. Dynamic linking is no longer required to traverse a PLT and GOT for library function address calculation.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Embodiments of the invention may be described herein with reference to data such as instructions, functions, procedures, data structures, application programs, configuration settings, code, etc. When the data is accessed by a machine, the machine may respond by performing tasks, defining abstract data types, establishing low-level hardware contexts, and/or performing other operations, as described in greater detail herein. The data may be stored in volatile and/or non-volatile data storage. For purposes of this disclosure, the terms "code" or "program" cover a broad range of components and constructs, including applications, drivers, processes, routines, methods, modules, and subprograms. Thus, the terms "code" or "program" may be used to refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. In one embodiment, use of the term control logic includes hardware, such as transistors, registers, or other hardware, such as programmable logic devices (535). However, in another embodiment, logic also includes software or code (531). Such logic may be integrated with hardware, such as firmware or micro-code (536). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

Referring to FIG. 1, for one embodiment, at least one of the processor(s) of processor and memory arrangement 104 may be packaged together with the computational logic (or a subset thereof) of ISA bridging layer 123 configured to practice the operations (or a subset thereof) of methods of FIGS. 3, 4, 6, 7. For one embodiment, at least one of the processor(s) of processor and memory arrangement 104 may be packaged together with the computational logic (or a subset thereof) of ISA bridging layer 123 configured to practice the operations (or a subset thereof) of FIGS. 3, 4, 6, 7 to form a System in Package (SiP). For one embodiment, at least one of the processor(s) of processor and memory arrangement 104 may be integrated on the same die with the computational logic (or a subset thereof) of ISA bridging layer 123 configured to practice the operations (or a subset thereof) of FIGS. 3, 4, 6, 7. For one embodiment, at least one of the processor(s) of processor and memory arrangement 104 may be integrated on the same die with the computational logic (or a subset thereof) of ISA bridging layer 123 to form a System on Chip (SoC). For at least one embodiment, the SoC may be utilized in a desktop computer, a laptop computer, a Smartphone, a computing tablet, an Internet appliance, a personal digital assistant (PDA), a portable game playing device, a server or other computing devices.

An embodiment includes a method executed by at least one processor comprising: loading an application having a source instruction set architecture (ISA); redirecting a call, which is for a library service of a source ISA library, to a first library so the call does not reach the source ISA library; directing the call from the first library to a library service of a target ISA library; and emulating the application via the target ISA library. The method may further comprise resolving an undefined symbol for the application. Resolving the undefined symbol comprises linking to a target gate of the target ISA library indirectly via a first gate of the first library. The first gate may have a first name and the target gate may have a target name that includes the first name. For example, the names (regardless of file extensions) may be identical or merely differ by prefix, suffix, and the like. Redirecting the call to the first library may comprise redirecting the call from an emulator that is dedicated to the application. Redirecting the call to the first library may comprise redirecting the call from an emulator that is dedicated to the application and that is not a general system loader. A method may comprise providing an additional call for an additional library service associated with the application; the additional call being directed to code included in a procedure linking table (PLT); and replacing the additional call with a direct additional call, which bypasses the PLT, to one of the source ISA library and an additional source ISA library. A method may include identifying an address for the additional call; and determining the additional call is directed to code included in the PLT based on identifying the address for the additional call. A method of claim 1 may comprise providing an additional call for an additional library service associated with the application; the additional call being directed to code configured to locate a procedure; and replacing the additional call with a direct additional call, which bypasses the code configured to locate the procedure, to one of the source ISA library and an additional source ISA library.

In an embodiment an apparatus may comprise at least one memory and at least one processor, coupled to the at least one memory, to perform operations comprising: loading an application having a source instruction set architecture (ISA); providing a call for a library service associated with the application, the additional call being directed to code configured to locate a procedure; replacing the call with a direct call, which bypasses the code configured to locate the procedure, to a source ISA library; and emulating the application via a target ISA library. The code configured to locate the procedure may be included in a procedure linking table (PLT). An embodiment may perform operations comprising: identifying an address for the call; and determining the call is directed to code included in the PLT based on identifying the address for the call. An embodiment may perform operations comprising: redirecting an additional call, which is for an additional library service of one of the source ISA library and an additional source ISA library, to a first library so the additional call does not reach the one of the source ISA library and the additional source ISA library; and directing the additional call from the first library to one of the target ISA library and an additional target ISA library. An embodiment may perform operations comprising resolving an undefined symbol for the application. In an embodiment resolving the undefined symbol comprises linking to a gate of the one of the target ISA library and the additional target ISA library via a gate of the first library. In an embodiment redirecting the additional call comprises redirecting the additional call from an emulator that is dedicated to the application. In an embodiment redirecting the additional call comprises redirecting the additional call from an emulator that is dedicated to the application and that is not a general system loader.

Thus, various embodiments include nested emulation for a source application and source emulator. Duplicate source ISA libraries redirect the source emulator library calls to a target library, thereby forcing the native emulator through proper emulation channels between first and second ISAs. This provides advantages that result in proper emulation. Also, an advantage of various embodiments is the increased efficiency and speed of dynamic linking. For example, efficiencies are gained over the indirect jumping associated with prior uses of methods based on PLTs and GOTs.

It will also be appreciated that the present disclosure may be a solution to the technical problem of providing enhanced security to a computing device. The advantage of the present disclosure may include, but is not limited to, the robustness of the isolation provided.

What is claimed is:

1. At least one non-transitory machine-readable medium having stored thereon data which, when used by at least one machine, causes the at least one machine to perform operations comprising:
   loading an application, the application being formatted based on a source instruction set architecture (ISA);
   redirecting a first call to a first library so the call does not reach a source ISA library;
   directing the first call from the first library to a library service of a target ISA library;
   replacing a second call with a third call; and
   emulating the application via the target ISA library and an operating system (OS);
   wherein:
     the first call is to a library service of the source ISA library;
     the second call is to an additional library service;
     the second call is directed to code configured to locate a procedure;
     the third call is to one of the source ISA library or an additional source ISA library;
     the third call is to bypass the code configured to locate the procedure; and
     the OS is formatted based on a target ISA, the target ISA corresponding to the target ISA library.

2. The at least one medium of claim 1:
   the operations comprising resolving an undefined symbol for the application;
   wherein resolving the undefined symbol comprises linking to a target gate of the target ISA library indirectly via a first gate of the first library.

3. The at least one medium of claim 2, wherein the first gate has a first name and the target gate has a target name that includes the first name.

4. The at least one medium of claim 1, wherein redirecting the first call to the first library comprises redirecting the first call from an emulator, the emulator being dedicated to the application.

5. The at least one medium of claim 1, wherein:
   redirecting the first call to the first library comprises redirecting the first call from an emulator;
   the emulator is dedicated to the application and is not a general system loader.

6. The at least one medium of claim 1 wherein:
   the code is included in a procedure linking table (PLT); and
   the third call bypasses the PLT.

7. The at least one medium of claim 6, the operations comprising:
  identifying an address for the second call; and
  determining the second call is directed to code included in the PLT based on identifying the address for the second call.

8. The at least one medium of claim 7 wherein:
  the additional library service is a service of the source ISA library;
  the third call is a direct call.

9. The at least one medium of claim 1 wherein the OS includes at least a portion of an Android OS.

10. The at least one medium of claim 1 wherein the OS includes at least a portion of an iOS.

11. The at least one medium of claim 1 wherein the OS includes at least a portion of a Linux OS.

12. The at least one medium of claim 1 wherein the OS includes at least a portion of a Windows OS.

13. The at least one medium of claim 1 wherein the application includes at least a portion of a browser.

14. The at least one medium of claim 1 wherein the at least one machine includes a mobile internet device.

15. The at least one medium of claim 1 wherein the at least one machine includes a server.

16. The at least one medium of claim 1 wherein the at least one machine includes a cell phone.

17. An apparatus comprising:
  at least one memory and at least one processor, coupled to the at least one memory, to perform operations comprising:
    loading an application, the application being formatted based on a source instruction set architecture (ISA);
    redirecting a first call to a first library so the call does not reach a source ISA library;
    directing the first call from the first library to a library service of a target ISA library;
    replacing a second call with a third call; and
    emulating the application via the target ISA library and an operating system (OS);
  wherein:
    the first call is to a library service of the source ISA library;
    the second call is to an additional library service;
    the second call is directed to code configured to locate a procedure;
    the third call is to one of the source ISA library or an additional source ISA library;
    the third call is to bypass the code configured to locate the procedure; and
    the OS is formatted based on a target ISA, the target ISA corresponding to the target ISA library.

18. The apparatus of claim 17, wherein the code configured to locate the procedure is included in a procedure linking table (PLT).

19. The apparatus of claim 17, wherein the OS includes at least a portion of at least one of an Android OS, iOS, or a Linux OS.

20. The apparatus of claim 17, wherein the apparatus includes at least one of a mobile internet device, a server, or a cell phone.

* * * * *